Sept. 21, 1971  ZENMON ABE ET AL  3,606,882
ECG PROCESSING SYSTEM FOR P- AND QRS-WAVE CHARACTERISTICS
Filed April 11, 1969  13 Sheets-Sheet 1

INVENTORS
ZENMON ABE, TAKAJI SUZUKI,
MASAYUKI TSUNEOKA, HIICHI KIMURA
TEIZO AKAZOME, KANJI OBAYASHI and
BY GENGO KASAI Craig, Antonelli Stewart & Hill ATTORNEYS

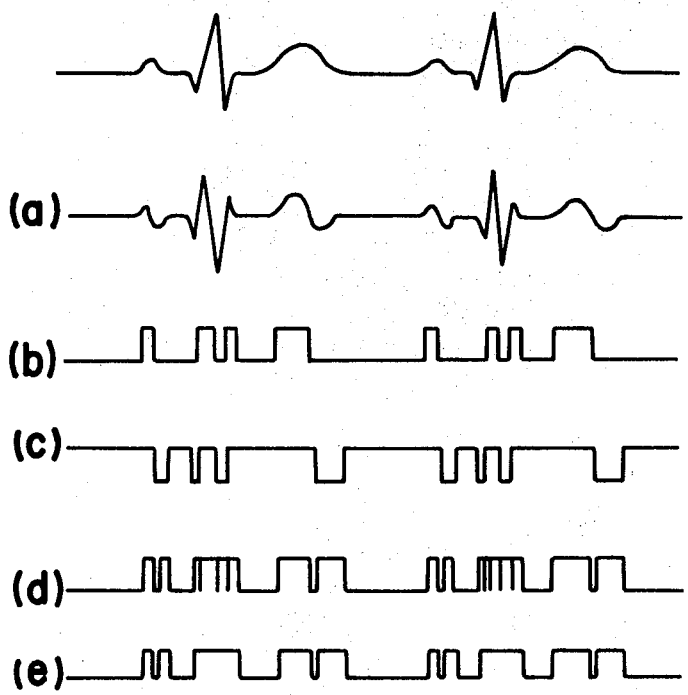
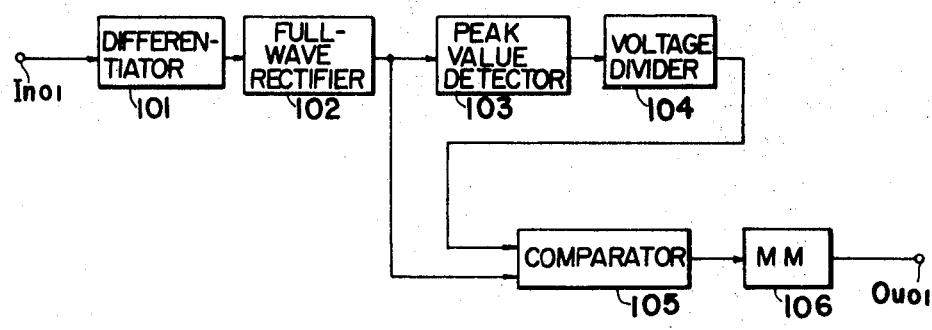

FIG. 11
(a)
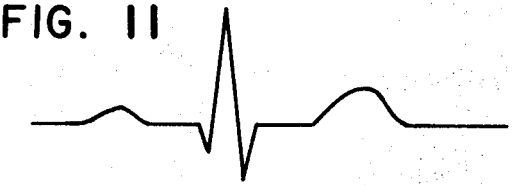
(b) DDQS SIGNAL
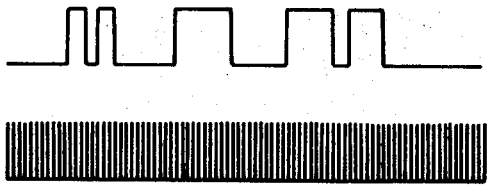
(c)
(d)
(e)
(f)
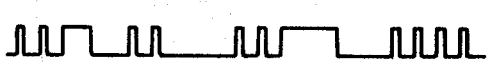
(g)
(h)
(i)
(j)
(k)
(L)
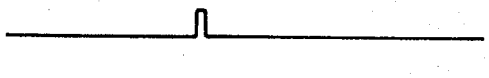
(m) QRSS SIGNAL

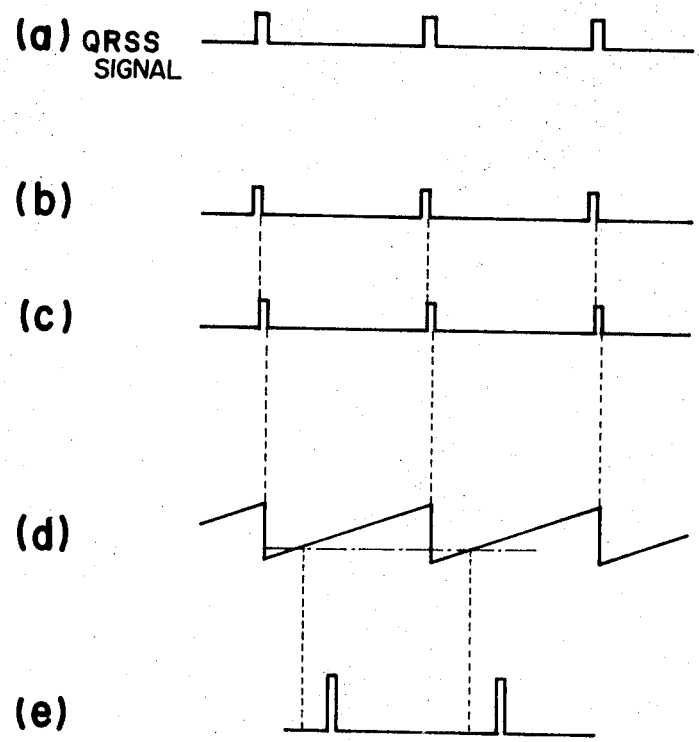

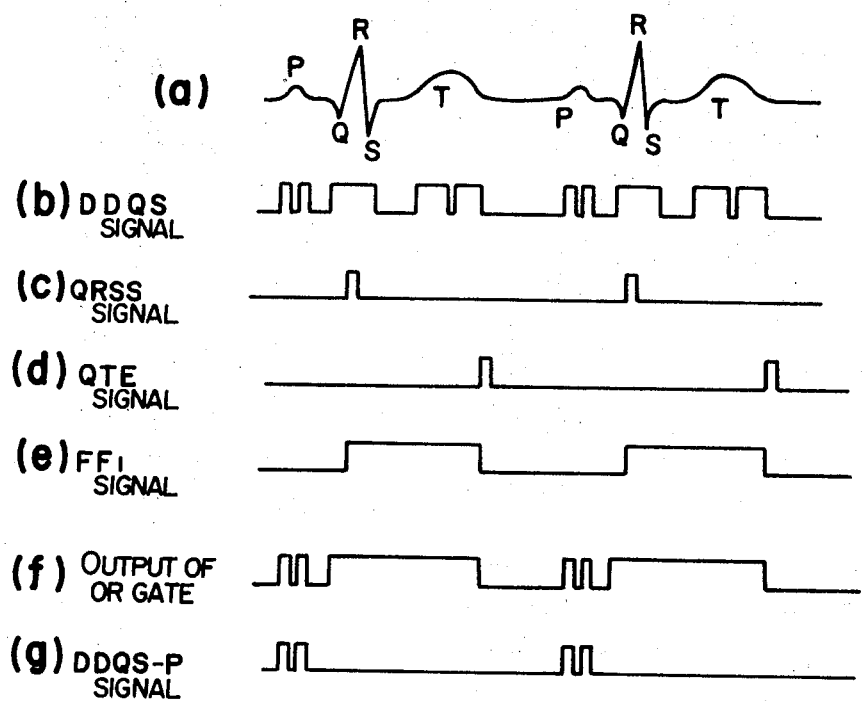

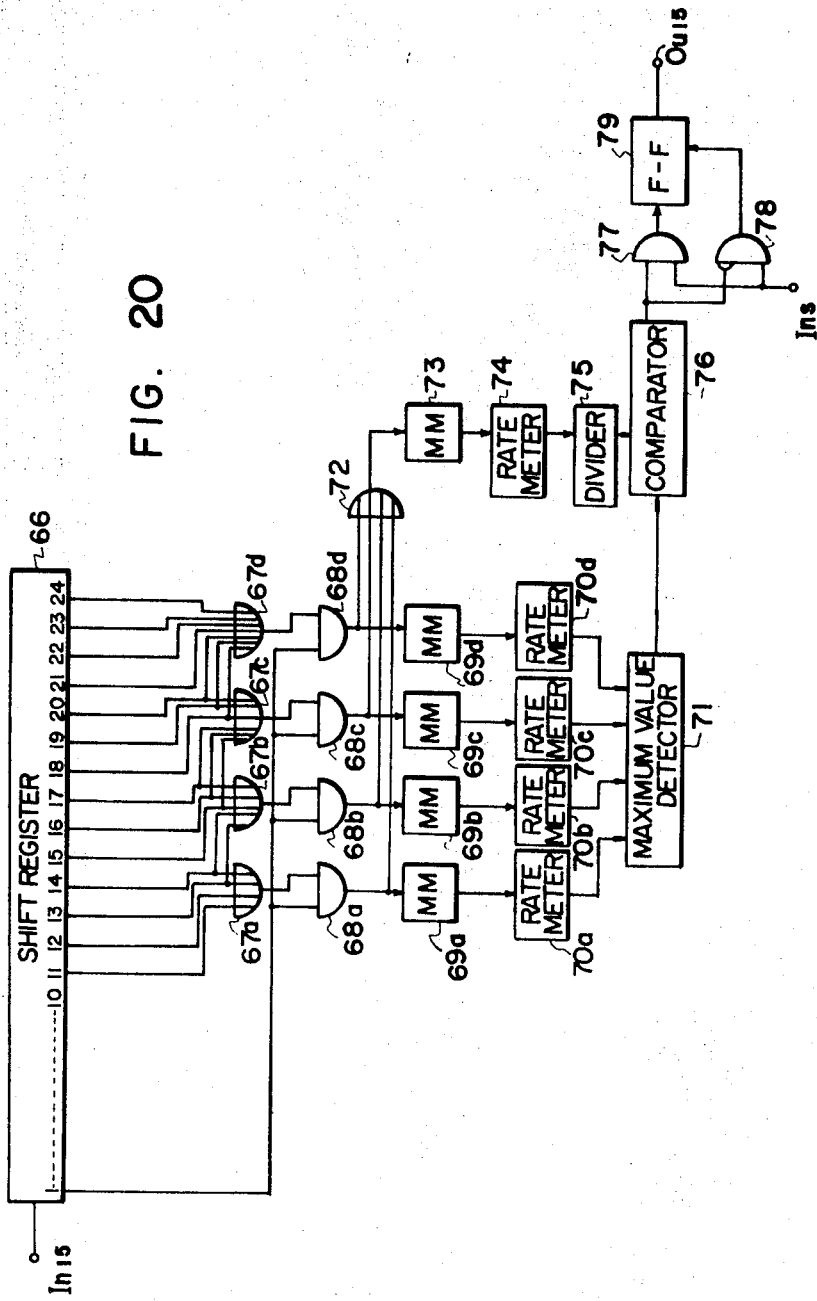

United States Patent Office 3,606,882
Patented Sept. 21, 1971

3,606,882
ECG PROCESSING SYSTEM FOR P- AND QRS-WAVE CHARACTERISTICS
Zenmon Abe, Takaji Suzuki, and Masayuki Tsuneoka, Kokubunji-shi, and Eiichi Kimura, Teizo Akazome, Kanji Obayashi, and Gengo Kasai, Tokyo, Japan, assignors to Hitachi, Ltd., Tokyo, Japan
Filed Apr. 11, 1969, Ser. No. 815,305
Claims priority, application Japan, May 20, 1968, 43/33,601
Int. Cl. A61b 5/04
U.S. Cl. 128—2.06A
16 Claims

ABSTRACT OF THE DISCLOSURE

A system for diagnosing heart diseases employs analog and digital circuitry which separates the P wave or the QRS wave from a waveform of cardiac potential. This waveform of cardiac potential includes the P wave, the QRS wave and the T wave. Through a plurality of storage and sampling elements, the width and amplitude of the QRS wave or the width, number of peaks and characteristics of the P wave are determined.

BACKGROUND OF THE INVENTION

Field of the invention

This invention relates to a system for detecting the cardiac potential, particularly the P wave and the QRS wave contained in the waveform of cardiac potential signal.

Description of the prior art

Generally speaking, a cycle of electro-cardiogram consists of a P wave, QRS wave and T wave as shown in FIG. 1a, of which the QRS wave sometimes assumes one of the particular forms respectively designated, for example, as RS, RSR'S', RSR', QRSR' or QS, some of which are shown in FIG. 1b. In clinical examination, the amplitude of the R wave is considered to be related to the ventricular hypertrophy, R' wave and width of QRS wave to the bundle branch block and Q wave to myocardial infarction. Therefore, it is very important for discrimination of said particular waves to detect the QRS wave apart from the P wave and T wave.

However, diagnosis of the above-mentioned disorders from a cardiogram, is usually considered as one of the most difficult practices for a medical expert, long experience and abundant knowledge being required. It is very natural that medical circles have been looking forward to an automatic device for making a diagnosis from a cardiogram.

SUMMARY OF THE INVENTION

In view of the above situation, this invention is directed to provide a system wherein a cardiac potential is detected as a pulse signal from which the above-mentioned particular waves are detected.

This invention will be described in detail hereunder in connection to embodiments of this invention and with reference to the attached drawings.

BRIEF DESCRIPTION OF THE DRAWINGS

FIG. 3 shows waveforms referred to in connection to the explanation of the embodiment shown in FIG. 1;
FIG. 4 is a block diagram of another part of the embodiment of this invention;
FIG. 11 shows waveforms referred to in the explanation of FIGS. 10a and 10b;
FIG. 13b is a block diagram of a circuit used in connection with the circuit of FIG. 13a;
FIG. 14 shows waveforms referred to in the explanation of FIG. 13a;
FIGS. 16 and 18 show waveforms referred to respectively in the explanation of FIGS. 15 and 17;
and
FIGS. 19 and 20 are block diagrams showing the constitution of other parts of the embodiment of this invention.

DESCRIPTION OF THE PREFERRED EMBODIMENTS

Figure 2:
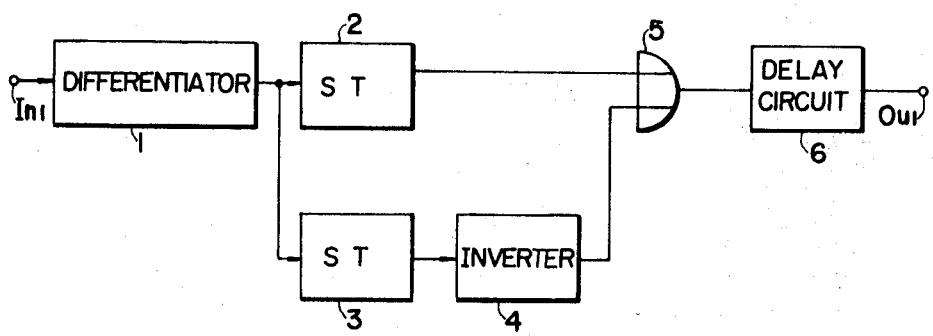
FIG. 2 is a block diagram showing the constitution of an embodiment of this invention.

Referring to FIG. 2 which shows the circuit for producing rectangular waves corresponding to the particular waveforms contained in a cardiac potential wave, reference numeral 1 indicates a differentiator for differentiating the cardiac potential wave introduced from the body of the patient, numerals 2 and 3 Schmitt trigger circuits (hereafter, referred to as an ST circuit) connected to the output of said differentiator 1, which have predetermined positive and negative thresholds, 4 an inverter for reversing the output from the ST circuit 3, numeral 5 an OR gate which receives, as inputs thereto, outputs from the ST circuit 2 and the inverter 4, and 6 a delay circuit for delaying the falling portion of the output from the OR circuit 5, the delay time being preferably about 10 to 20 ms. Further, markings $In_1$ and $Ou_1$ indicate input and output terminals respectively.

Figure 1A:
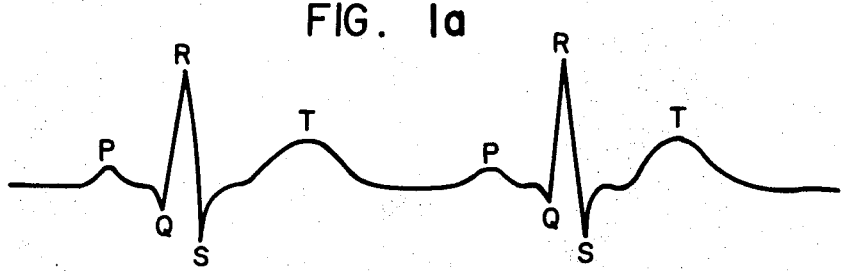
FIGS. 1a and 1b show various forms of the cardiac potential wave.
Figure 1B:
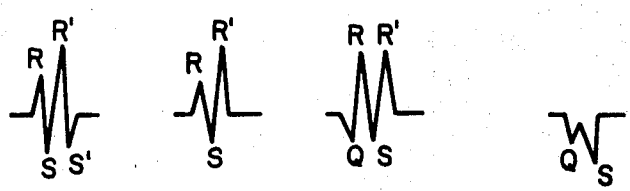

A cardiac signal as shown in FIG. 1a received at the input signal $In_1$ is differentiated in the differentiator 1 to become the so-called differentiated cardiac signal as indicated by index (a) in FIG. 3. The positive and negative excursions of said differentiated cardiac signal constitute inputs respectively to the ST circuits 2 and 3, and pulse signals as indicated by indexes (b) and (c) in FIG. 3 are produced from the ST circuits 2 and 3 respectively. The pulse signal from the ST circuit 3 is applied to the OR circuit 5 as one input thereof after being reversed in polarity through the inverter 4 and it is combined with another input of the OR circuit, which is the pulse signal from the ST circuit 2, thereby to produce an output as indicated by (d) in FIG. 3. In such a combined pulse sequence, pulse intervals in the portions corresponding to the QRS waves are usually less than 10 ms. Therefore, when the pulse sequence obtained from the OR circuit 5 is delayed through the delay circuit 6 which imparts a delay of about 10 ms. or longer, the pulse intervals less than 10 ms. will be eliminated, thus the pulses corresponding to a QRS wave being converted to a rectangular waveform as is seen in the pulse sequence indicated by index (e) in FIG. 3.

In the above embodiment, two ST circuits are used. However, a similar result can be obtained by rectifying the above-mentioned differentiated cardiac signal through a full-wave rectifier and by processing the rectified signal with an ST circuit.

Thus, the particular wave-forms included in a cardiac signal can be located in a sequence of pulse signals.

In order to detect a rectangular wave corresponding to the QRS wave in the above-mentioned pulse sequence, it is only required to detect a coincidence of said rectangular wave corresponding to the QRS wave with a control signal produced in relation to the peak potential of the differentiated cardiac signal. It will be noted that said peak potential is invariably found in a QRS wave.

Referring to FIG. 4 which shows an arrangement for obtaining at the above-mentioned control signal, mark $In_{01}$ indicates an input terminal, numeral 101 a differentiator, 102 a full-wave rectifier for rectifying the output from the differentiator 1, 103 a peak value detector, 104 a voltage divider for producing a potential equivalent to 60 to 70% of the peak value, which comprises, for example, a potentiometer or a discharge circuit, 105 a comparator for comparing output from the full-wave rectifier 102 with output from the voltage divider 104, numeral 106 a monostable multivibrator (hereafter, abbreviated as a MM unit) actuated by the output from the comparator 105, and mark $Ou_{01}$ indicate an output terminal from said MM unit. Said MM unit is preset to maintain an ON state for about 100 ms. when it receives an input signal. With such an arrangement, when a cardiac signal as shown in FIG. 1a is fed to the differentiator 101, it produces, as an output, the differentiated cardiac signal as indicated by (a) in FIG. 3, which in turn is fed to the full-wave rectifier 102 where negative peaks, if any are included, are reversed in the polarity. Output of the rectifier 102 is fed to the peak value detector 103 and the comparator 105. The peak value of the differentiated cardiac signal detected in said detector 103 is divided in the voltage divider 104, and a potential corresponding to 60 to 70% of said peak value is given to the comparator 105 to be compared with the output from the full-wave rectifier 102. Output of the comparator 105 is applied to the MM unit 106. The MM unit 106, upon recept of the signal from the comparator 105, produces an output signal of about 100 ms. in pulse width, which is to be used for the previously-mentioned detection of the QRS wave as control signal (hereafter, referred to as a QRSS signal).

It will be understood that in the arrangement shown in FIG. 4, the full-wave rectifier 102 may be connected so as to produce an output of negative polarity and the comparator 105 may be omitted.

Figure 5:
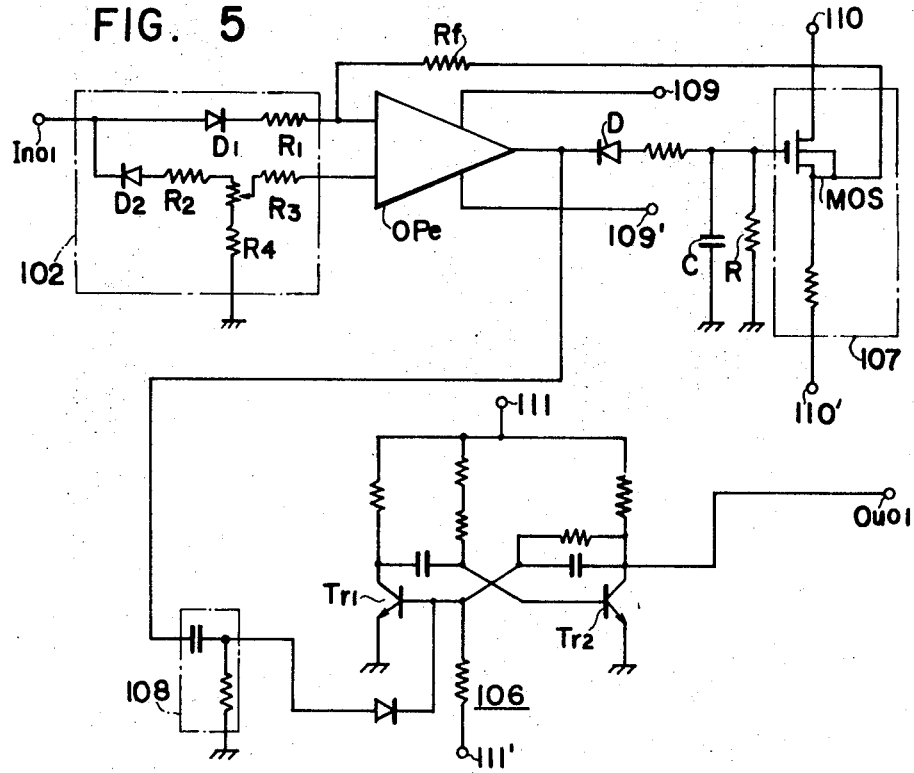
FIG. 5 is a circuit diagram of the essential part of the embodiment shown in FIG. 4.

FIG. 5 is a circuit diagram showing the essential portion of an embodiment of this invention. In this embodiment, the above-mentioned comparator is omitted. The full-wave rectifier 102 is composed of diodes $D_1$ and $D_2$ and resistors $R_1$, $R_2$, $R_3$ and $R_4$. The peak value detector 103 and the voltage divider 104 constitutes one unit which includes an operation amplifier OPe a diode D, and a charge and discharge circuit consisting of a capacitor C and a resistor R. The MM unit 106 comprises NPN transistors $Tr_1$ and $Tr_2$. Output of the source follower 107 which comprises an insulated-gate field effect transistor MOS is fed back negatively to the operation amplifier OPe through a resistor Rf. Further, reference numeral 108 indicates a differentiator for providing the MM unit 106 with the trigger signal, 109 and 109′ respectively positive and negative power terminals of the operation amplifier OPe, 110 and 110′ respectively positive and negative power terminals of the source follower 107, and 111 and 111′ respectively positive and negative power terminal of the MM unit 106.

With the above-described arrangement, the defferentiated cardiac signal applied to the input terminal $In_{01}$ is rectified through the full-wave rectifier 102 to be fed to the operation amplifier OPe, output of which is led to the capacitor C through the diode D to charge said capacitor C to the peak value of the above-mentioned differentiated cardiac signal. As the heartbeats occur usually with a period of 1.5 to 3 seconds, the terminal voltage of the capacitor C raised to said peak value gradually attenuates usually to 60 to 70% of said peak value before the next heartbeat occurs, the rate of attenuation depending on the time constant which is determined by the capacitor C and the resistor R. Therefore, if the input signal to the operation amplifier is less than the fed-back signal, the diode D will be biased in the reverse direction and a positive saturation voltage will appear at the output of the operation amplifier OPe. This saturation voltage is differentiated in the differentiator 108 to become a trigger signal for the MM unit 106, and the control signal, i.e., a QRSS signal is obtained at the output terminal $Ou_{01}$.

Figure 6:
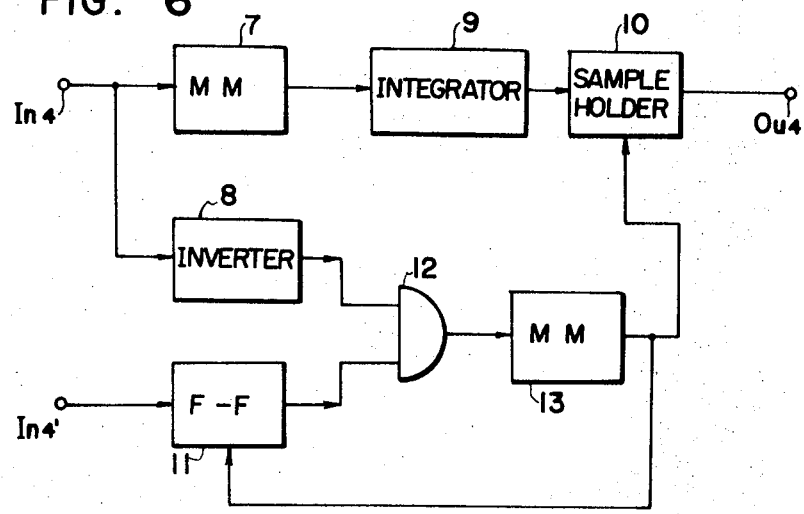
FIGS. 6 and 7 are block diagrams showing the constitution of other parts of the embodiment of this invention.

In the circuit shown in FIG. 6; the QRSS signal obtained through the process as described above is utilized for detecting the QRS signal. In FIG. 6; reference numerals 7 and 8 indicate respectively a MM unit and an inverter both of which receive a pulse sequence as indicated by (e) in FIG. 3; 9 an integrator controlled by the output of said MM unit which comprises, for example, an operation amplifier and an integrating capacitor; 10 a sample holder for holding the output of said integrator; 11 a flip-flop circuit which is to be set by said QRSS signal; 12 an AND gate which receives the outputs of said flip-flop circuit 11 and said inverter 8 as the input thereto; and 13 a MM unit which is actuated by the output of the AND gate 12. Further, marks $In_4$ and $Ou_4$ indicate an input terminal and an output terminal respectively, and $In_4'$ an input terminal for the QRSS signal.

In the above arrangement, if said pulse sequence is applied to the input terminal $In_4$, the MM unit 7 operates at the leading edge of each pulse, and the output of the MM unit 7 resets the integrator 9, for example, by short-circuiting electronically the integrating capacitor contained in said integrator 9. At the same time, a new integrating operation is started in the integrator 9, which lasts until the next resetting. On the other hand, said input pulse sequence is supplied also to the AND gate 12 after inversion of the polarity through the inverter 8. Meanwhile, the above-mentioned QRSS signal imposed on the control signal input terminal $In_4'$ sets the flip-flop 11, the output of which is given to the AND gate 12 as another input thereof. The AND gate 12 produces output signals in response to the rise of the pulse from the flip-flop 11 and the buildup part in the trailing edge of the signal from the inverter 8. The MM unit 13 produces pulse signals responding to said output of the AND gate 12, and one of these pulse signals initiates the hold operation of the sample holder 10. That is, a voltage proportional to the pulse width of the pulse signal from the integrator 9 which is related to the QRS wave, is held in the sample holder 10 in response to the backside of the pulse which is related to the QRS wave. At the same time, the flip-flop circuit 11 is reset by another input which is output of the MM unit 13.

As described above, the required QRS wave is detected as a voltage proportional to the width thereof, thus providing the information necessary for the clinical diagnosis.

Further, it is required to determine the amplitude of said QRS wave, because the information about said amplitude is important for a proper diagnosis. However, there are various variations of the QRS wave as described previously, including the RS′R′ type, QS type and others, and it is required to determine the amplitude in regard to the respective peaks of Q, R, S, R′ and S′. It will be seen from the wave-forms indicated by indexes (a), (b) and (c) in FIG. 8 that in the cardiac signals of types RS′R′, QRS and QS, peaks R and R′ appear at the transition from a positive-going excursion to a negative-going one, while peaks Q, S and S' at the transition from a negative-going to a positive-going excursion. This feature is utilized to determine the region in which the amplitudes of the respective peaks are determined from the peak value within said region.

Figure 8:
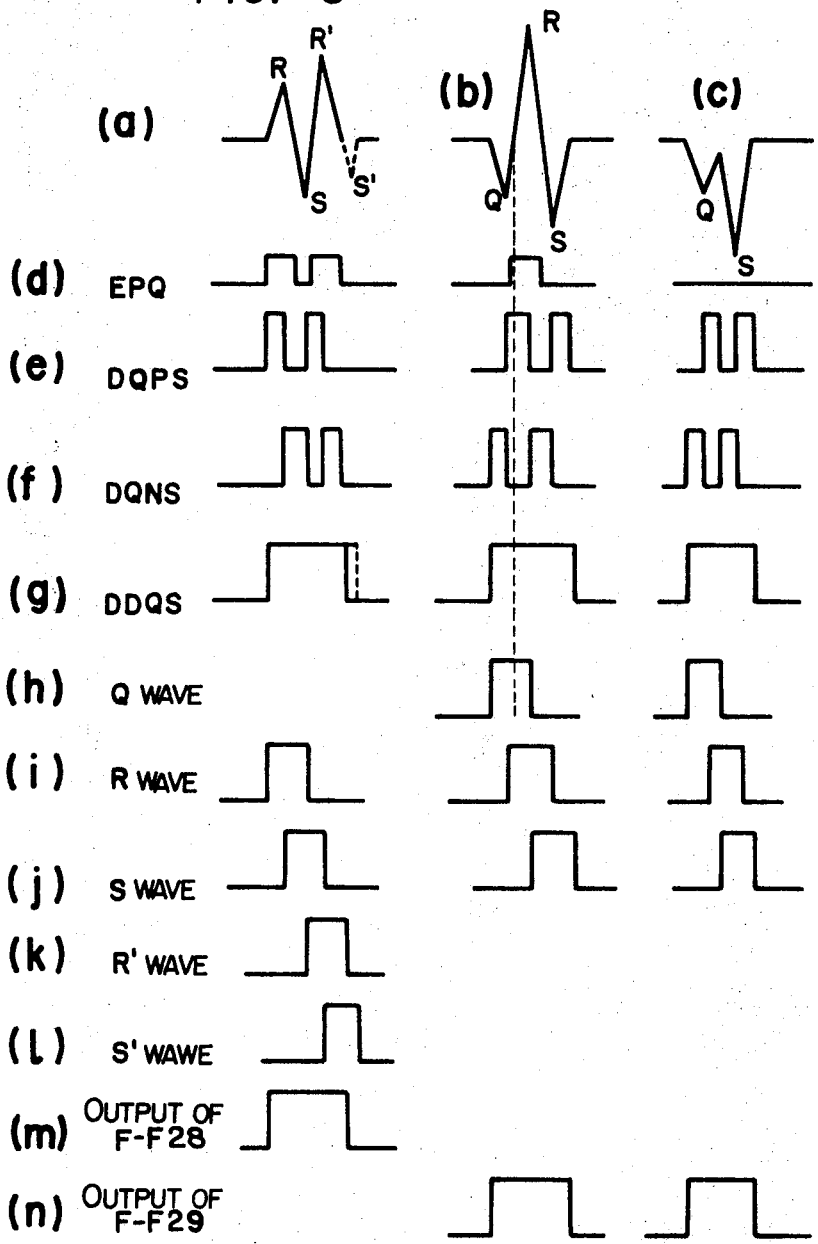
FIG. 8 shows waveforms referred to in the explanation of FIG. 7.

In order to determine the above-mentioned region, a circuit consisting of a differentiator and two ST circuits respectively having a positive threshold and a negative threshold as shown in FIG. 2, is employed. By the operation as described previously, the DQPS waves indicated by (e) in FIG. 8 are obtained from the ST circuit 2 as the indication of the positive-going pulses such as R and R' respectively in correspondence to the wave-forms indicated by (a), (b) and (c) in FIG. 8. On the other hand, the DQNS waves indicated by (f) in FIG. 8 are obtained from the ST circuit 3 as the indication of the negative-going pulses such as S', Q and S. These two signals are used along with the DDQS signal as indicated by (g) in FIG. 8, which is an indication of the whole of the QRS wave and is obtained by the arrangement shown in FIG. 2.

Figure 7:
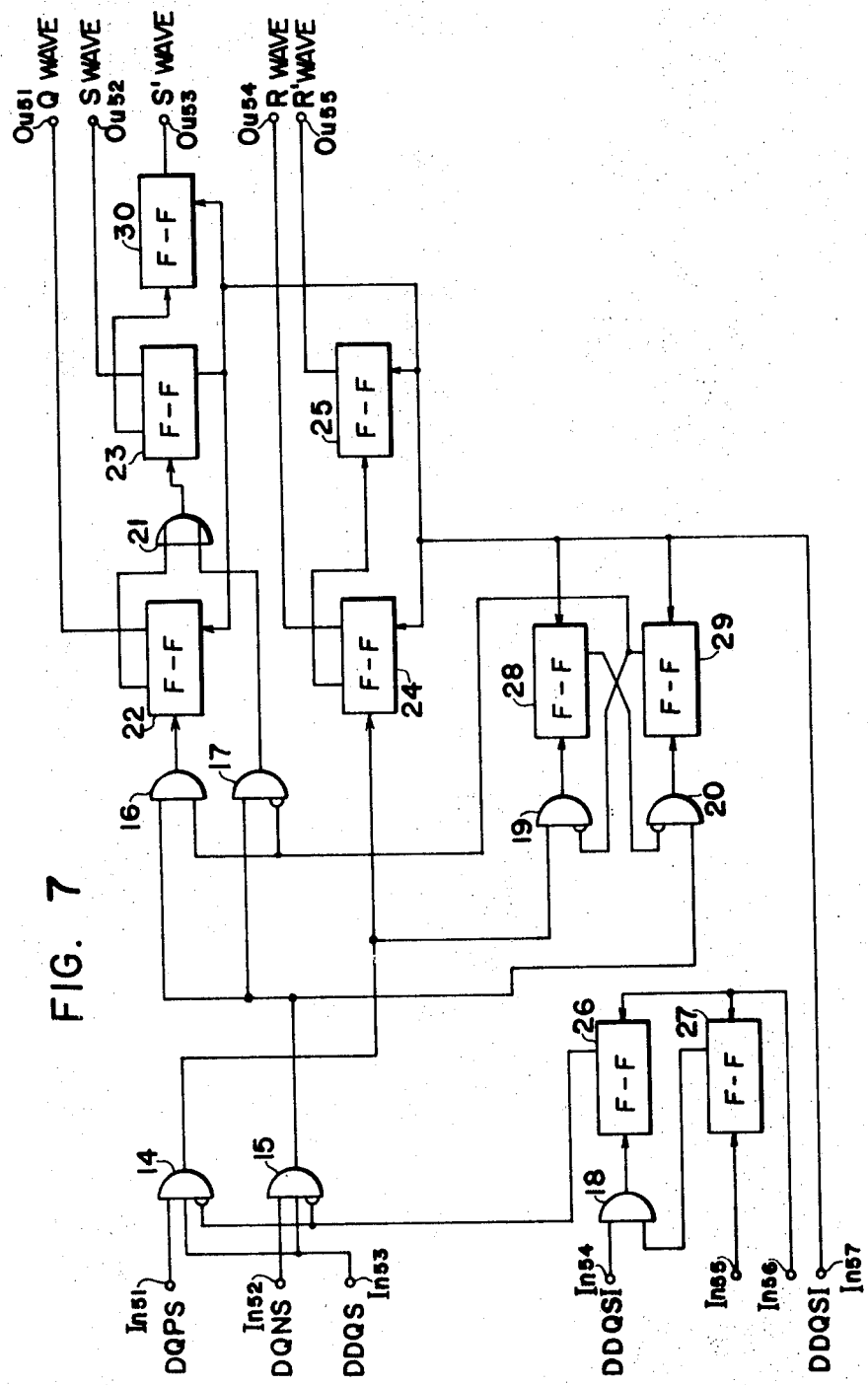

The circuit shown in FIG. 7 which comprises AND gates, OR gates and flip-flop circuits (hereafter abbreviated as F—F), are used to produce pulse signals for determining the above-mentioned regions, utilizing the above-mentioned signals DQPS, DQNS and DDQS. In FIG. 7, the circuit consisting of AND circuits 19 and 20, and F—F 28 and 29, discriminates between the Q wave and S wave, both of which are negative-going waves, depending on whether the DQPS signal indicating a positive-going wave appears first or the DQNS signal indicating a negative-going wave appears first. When a start signal ordering the start of operation is applied to the input terminal $In_{56}$, the F—F's 26 and 27 are reset, and accordingly no signal is fed to the inhibit terminals of the AND gate 14 and 15. Therefore, assuming that a DQPS signal which is indicative of a wave devoid of a Q wave (that is, a wave lacking a negative-going peak) as indicated by (a) in FIG. 8 appears first, a DDQS signal and the DQPS signal are applied to the AND gate 14 respectively through the input terminals $In_{53}$ and $In_{51}$ to open said gate 14. Output of the AND gate 14 opens the AND gate 19 to set the F—F 28. Upon the setting of the F—F 28, the AND gate 20 is inhibited by the output of said F—F 28, and thereafter the F—F 29 will not be set even if a DQNS signal appears at the terminal $In_{52}$. If a DQNS signal appears first, a DDQS signal and the DQNS signal are applied to the AND gate 15. Then, the AND gate 20 which is not inhibited by the output of the F—F 28. opens to set the F—F 29.

If the F—F 29 is in the set-state hinting at the inclusion of a Q wave, the AND gate 16 receives the output of the F—F 29 as one input and the output of the AND gate 15 as the other input, and the F—F 22 is set by the first pulse of the DQNS signal from the AND gate 16 and then reset by the second pulse of the same signal, thereby a pulse signal for determining said region of the Q wave being obtained from the output terminal $Ou_{51}$ as indicated by (h) in FIG. 8. Upon the resetting of the F—F 22, the F—F 23 is set through the OR gate 21, and then is reset by the DDQSI signal which is an inversion of the DDQS signal indicative of the whole of the QRS wave as shown in FIG. 8 and which is applied to the input terminal $In_{57}$. Thus, a pulse signal for determining the region of the S wave as indicated by (j) in FIG. 8, is obtained from the output terminal $Ou_{52}$.

Further, if a S' wave exists after the R' wave as shown by the dotted line in FIG. 8(a), the F—F 23 is reset by the ensuing DQNS signal and the pulse signal for determining the region of the S wave is obtained. At the same time, the F—F 30 is set. However, the F—F 30 is soon reset by the DDQS signal indicative of the whole signal including the S' wave, and a pulse signal for determining the region of the S' wave is obtained from the output terminal $Ou_{53}$ as indicated by (l) in FIG. 8.

A set-state of the F—F 28 is indicative of nonexistence of the Q wave. The F—F 24 is set by an output of the AND gate 14 to be soon reset by the ensuing DQPS signal, and a pulse signal for determining the region of the R wave is obtained from the output terminal $Ou_{54}$ as indicated by (i) in FIG. 8. At the same time as the setting of the F—F 24, the F—F 25 is set, and then it is reset by the ensuing DDQSI signal, and a pulse signal for determining the region of the R' wave is obtained from the output terminal $Ou_{55}$ as indicated by (k) in FIG. 8.

The above-described operation must be stopped after said pulse signals for determining the region of the respective peak waves are obtained. For this purpose, the QRSS signal is applied to the input terminal $In_{55}$ to set the F—F 27. Output of the F—F 27 and DDQSI signal applied to the input terminal $In_{54}$ which indicates the end of the QRS wave, are applied to the AND gate 18 output of which sets the F—F 26. Output of the F—F 26 is fed to inhibit terminals of the AND gate 14 and 15 to inhibit the DQPS or DQNS signal that may follow. Indexes (m) and (n) in FIG. 8 indicate the output of the F—F's 28 and 29 respectively.

Figure 9:
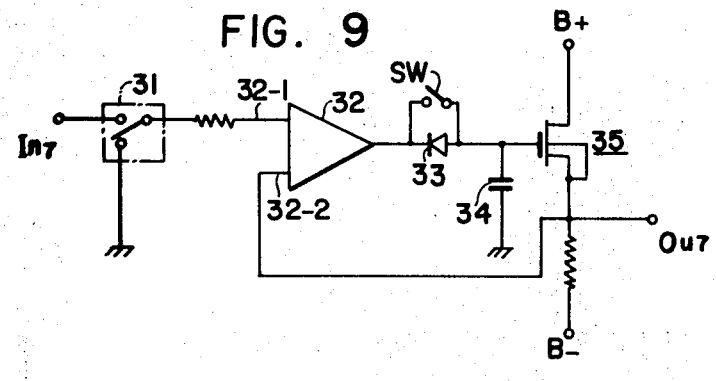
FIG. 9 is a circuit diagram of the essential part of the embodiment of this invention.

FIG. 9 is a circuit diagram of a peak holder with which the amplitude of each peak is determined using the above-described pulse signal for determining the region of the particular wave. In FIG. 9, reference numeral 31 indicates an electronic switch controlled by the above-mentioned respective pulse signals, 32 an operation amplifier, the signal input terminal 32–1 of which is connected to said electronic switch, 33 a diode connected to the output of said operation amplifier 32, numeral 34 a capacitor for holding a peak voltage connected to said diode 33, and 35 a source follower comprising an insulated gate field effect transistor for deriving an output from the capacitor 34, output of said source follower being fed back to the operation amplifier 32 through the terminal 32–2. Mark $In_7$ indicates an input terminal to which the cardiac signal as indicated by (a) in FIG. 8 is applied, and $Ou_7$ is an output terminal connected to the source electrode of the above-mentioned transistor, B+ and B— are respectively positive and negative power terminals, and SW a reset switch connected across the diode 33.

In the above arrangement, when a cardiac signal including the QRS wave as indicated by (a) in FIG. 8 is applied to the input terminal $In_7$, the electronic switch 31 is turned to the upper position by an actuating means (not shown) which is operated by the pulse signal for determining the region of the Q wave as indicated by (h) in FIG. 8, thus to introduce said cardiac signal to operation amplifier 32; and the peak value of the Q wave is held in the capacitor 34. As this peak value is negatively fed back through the source follower 35, the diode 33 is inversely biased, and a voltage corresponding to the peak value of the Q wave appears at the output terminal $Ou_7$. Then, the switch 31 acts so as to connect the input terminal $In_7$ to the ground in response to the fall of said pulse signal for determining the respective regions. Thus, a voltage corresponding to the peak value or amplitude of the Q wave is maintained at the output terminal $Ou_7$. The reset switch SW is used for short-circuiting the diode 33 thereby to reset the capacitor 34 before each operation.

As described above, the amplitude of a peak wave contained in the QRS wave can be detected. If a plurality of the peak value holders as described above are provided respectively for said particular peak waves and the respective switches are controlled by the above-mentioned pulse signals for determining the respective regions as shown in FIG. 8, the amplitudes of the particular waves can be determined respectively. It will be understood that the above-mentioned diode is connected in a proper direction depending on the polarity of the particular wave assigned to the particular peak holder.

The EPQ signal as indicated by (d) in FIG. 8 is produced by a ST unit which operates when the cardiac signal as indicated by (a) or (b) in FIG. 8 crosses the zero line from the negative region to the positive region. This EPQ signal and the pulse signal for determining the region of the Q wave as indicated by (h) in FIG. 8, are applied to an AND gate, and an output of said AND gate is subtracted from the pulse signal as indicated by (h) in FIG. 8 which is indicative of the region of the Q wave. Thus, the amplitude of the Q wave can be determined.

However, as the above-mentioned zero line or base line is apt to move owing to the drift of the amplifier or inductive interference, a more accurate base line is required for a reliable operation. Such an accurate zero line is determined from the zero voltage that is detected just before the P wave of a normal pulse. However, with a quick pulse, that is, a tachycardia in which the T wave and the P wave overlap each other, said zero voltage is detected just before the Q wave.

Figure 10A:
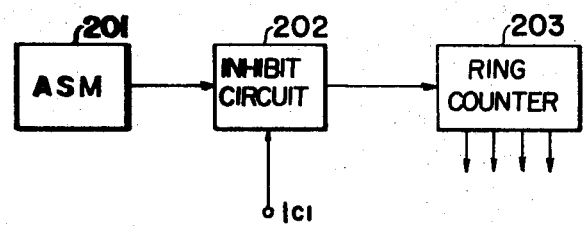
FIGS. 10a and 10b are block diagrams showing the constitution of another essential parts of said embodiment.
Figure 10B:
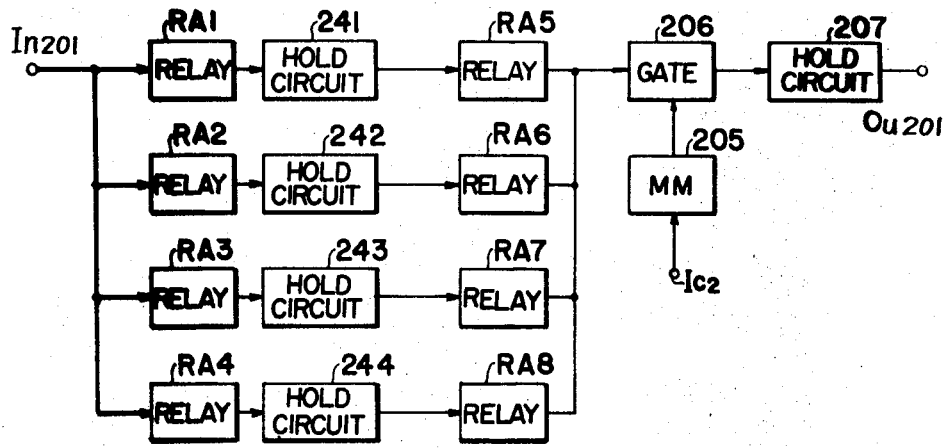

FIGS. 10a and 10b show a circuit for detecting the zero voltage just before the Q wave using the previously-mentioned DDQS signal indicative of the respective waves of the cardiac signal as indicated by (b) in FIG. 11 and the QRSS signal as indicated by (m) in FIG. 11.

Referring to FIGS. 10a and 10b, reference numeral 201 indicates an astable multivibrator (hereafter, abbreviated as ASM), 202 an inhibit circuit one of whose inputs is the output of said ASM 201 and which is inhibited by the DDQS signal, 203 a ring counter of four bits, marks RA1 to RA4 relays respectively controlled by the outputs of said ring counter 203, numeral 241 to 244 hold circuits fed with the cardiac signals through the respective relays RA1 to RA4, marks RA5 to RA8 relays controlled respectively by the output of said ring counter 203 for deriving an output from the respective hold circuits 241 to 244, numeral 205 a MM unit to be triggered by the QRSS signal, 206 a gate controlled by the output of said MM unit 205, and 207 a hold circuit connected to the output of said gate 206. Marks $In_{201}$ and $Ou_{201}$ are respectively input and output terminals, and $Ic_1$ and $Ic_2$ control terminals for receiving the DDQS signal and QRSS signal respectively.

In the above-described arrangement, a pulse sequence as indicated by (c) in FIG. 11 is generated in the ASM 201 to be fed to the inhibit circuit 202. As the inhibit circuit 202 is fed also with the DDQS signal through the control terminal $Ic_1$, the output of said inhibit circuit 202 becomes a pulse sequence as indicated by (d) in FIG. 11. As the ring counter 203 is controlled by the above-mentioned pulse sequence from the inhibit circuit 202, relays $RA_1$ to $RA_4$ which are controlled by outputs from the ring counter 203 operate as indicated respectively by (e), (f), (g) and (h) in FIG. 11, and at the same time, relays $RA_5$ to $RA_8$ operate as indicated by (i), (j), (k) and (l) in FIG. 11 respectively in synchronization with said relays $RA_4$, $RA_1$, $RA_2$ and $RA_3$. Therefore, an input cardiac signal (as indicated by (a) in FIG. 11) applied to the input terminal $In_{201}$ is passed through any of the relays $RA_1$ to $RA_4$ which is conducting at respective instants, and is held in the associated hold circuits 241 to 244. The signal voltages held in said hold circuits 241 to 244 are taken out through the relays $RA_5$ to $RA_8$ which make contact respectively in synchronization with relays $RA_4$, $RA_1$, $RA_2$ and $RA_3$. For example, at the instant when the relay $RA_4$ is conducting, the signal voltage held in the hold circuit 241 is let out through the relay $RA_5$.

When the above-mentioned QRSS signal which is indicative of the peak value of the differentiated cardiac signal is applied to the control terminal $Ic_2$ as a trigger of the MM unit 205, the output of the MM unit 205 appears while a rectangular wave indicative of the QRS signal is appearing in the DDQS signal. That is, the MM unit 205 produces an output while the inhibit circuit 202 is inhibited by the DDQS signal as indicated by (b) and (d) in FIG. 11, and since this is the period when the relay $RA_2$ is in a closed state (conducting state) as indicated by (f) and (k) in FIG. 11, the output is let out from the hold circuit 243 through the relay $RA_7$.

As the voltage in the hold circuit 243 has been entered through the relay $RA_3$, it is a signal voltage just before the Q wave of the input cardiac signal. This signal voltage just before the Q wave is held in the hold circuit 207 through the gate 206 which opens in response to the output from the MM unit 205.

As described above, the voltage just before the Q wave of the cardiac signal is obtained, and this voltage is subtracted from the cardiac signal. Then, the base line of the cardiac signal will be determined by the point where said signal becomes zero.

Figure 12:
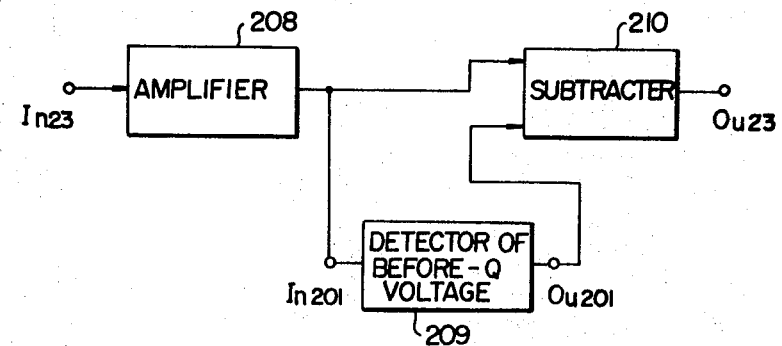
FIG. 12 is a block diagram of another part of said embodiment.

FIG. 12 shows a circuit for removing said voltage just before the Q wave from the cardiac signal. In FIG. 12, reference numeral 208 indicates an amplifier for amplifying the cardiac signal introduced from a patient's body, 209 means for detecting said voltage just before the Q wave as shown in FIGS. 10a and 10b, and 210 a subtracter for subtracting said voltage just before the Q wave from the cardiac signal. Marks $In_{23}$ and $Ou_{23}$ indicate input and output terminals respectively, and $In_{201}$ and $Ou_{201}$ indicate components similar or equivalent to those of the corresponding marks in FIG. 10b. In the arrangement shown in FIG. 12, the cardiac signal applied to the input terminal $In_{23}$ is amplified in the amplifier 208, and one part of the output of said amplifier 208 is fed to one of the input terminals of the subtracter 210, while the other part of the output is fed to the input terminal $In_{201}$ of the circuit shown in FIG. 10b where the voltage just preceding the Q wave is detected as described above. The thus detected voltage is fed to the other input terminal of the subtracter 210 through the output terminal $Ou_{201}$. Thus, the cardiac signal having the base line of zero potential is obtained from the output terminal $Ou_{23}$ of the subtracter 210.

In the above embodiment, the base line of the cardiac signal is determined by the voltage just before the Q wave of said cardiac signal. However, for a normal pulse, it is required to detect the voltage just before the P wave at least in order to avoid the effects of the T wave. For that purpose, the first rising part of the DDQS signal, which appears after the end of the T wave, is utilized. The interval from the Q wave to the T wave in the $n$th cardiac cycle are determined physiologically by the following formula:

$$QT_n = 0.2\ RR_{n-1} + 0.12\ (s)$$

where $RR_{n-1}$ stands for the interval between the R waves in $(n-1)$th and $n$th cardiac cycles.

Thus, QTE signal which is indicative of the end of the T wave may be produced after the lapse of the QT time.

Figure 13A:
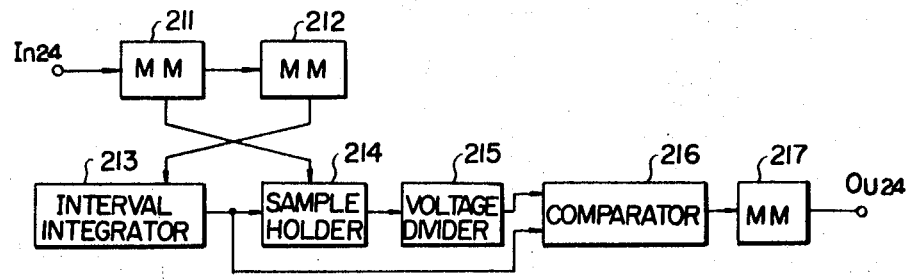
FIG. 13a is a block diagram of a pulse signal generator used in connection with this invention.

FIG. 13a shows an arrangement for obtaining the above-mentioned QTE signal. The QRSS signal as indicated by (a) in FIG. 14 is applied to a MM unit 211 through an input terminal $In_{24}$ and a pulse sequence as indicated by (b) in FIG. 14 is generated from said MM unit 211 is supplied to another MM unit 212, which the other output is given to a sample holder 214. The MM unit 212 in turn generates a pulse sequence as indicated by (c) in FIG. 14. This pulse from the MM unit 212 is applied to an interval integrator 213 to reset said integrator 213. Thus, said integrator stops the operation momentarily as indicated by (d) in FIG. 14, and the peak value of the integrated voltage is held in the sample holder 214, and then said integrator 213 starts the integration again. The voltage held in the holder 214 is fed to a comparator 216 as one input thereof after being reduced to 20% of the initial voltage through a voltage divider 215. As the other input of the comparator 216 is output of the interval integrator 213, the comparator 216 produces an output when the output of the integrator 213 reaches 20% of the maximum value of the integrated voltage, and this output is fed to an MM unit 217. If the MM unit 217 is set so that the duration of the oscillation is 0.12 second, a pulse as indicated by (e) in FIG. 14 will be produced from the MM unit 217 at 0.12 second after the appearance of the output from the comparator 16. Thus, a pulse signal which fulfills the requirement of the previously mentioned formula, that is, the QTE signal is obtained from the output terminal $Ou_{24}$.

Therefore, the voltage immediately before the P wave can be determined in a similar manner as in the case of the Q wave described previously, by giving the first pulse front of the DDQS signal appearing after the QTE signal to the MM unit 205 shown in FIG. 10b as a trigger signal, output of the MM unit 205 being supplied to the gate 206. An arrangement for obtaining said first pulse front of the DDQS signal will be described in the following paragraph.

Figure 13B:
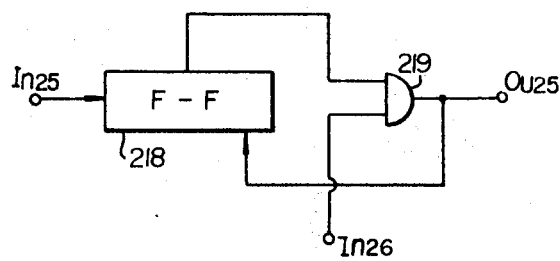

In FIG. 13b which shows an arrangement for taking out the first pulse front of the above-mentioned DDQS signal which appears following the above-mentioned QTE signal, reference numeral 218 indicates an F—F, 219 an AND gate, $In_{25}$ and $In_{26}$ input terminals, and $Ou_{25}$ an output terminal. The QTE signal obtained in a manner as described above is applied to the F—F 218 through the input terminal $In_{25}$ to set it, the output of the F—F 218 being one input of the AND gate 219. In this state, if the above DDQS signal is applied to the AND gate 219 as the second input through the input terminal $In_{26}$, the first appearing pulse front of the DDQS signal is let out through the output terminal $Ou_{25}$. This output signal is used to trigger the MM 205 as mentioned above and also to reset the F—F 218.

In the above paragraphs, the automatic processing of the QRS wave contained in the cardiac signal was described. However, this invention is applicable also to the automatic processing of the P wave.

In the diagnosis of heart diseases from an electrocardiogram, examination must be done about the existence of a P wave, width and amplitude of the P wave if there is one, and regularity of the rhythm of repetition if there are many P waves.

Figure 15:
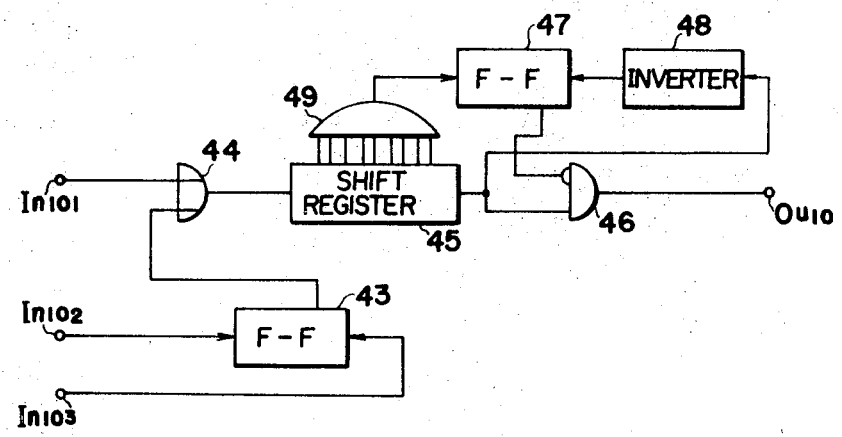
FIGS. 15 and 17 are block diagrams showing the constitution of other parts of said embodiment.

In the circuit shown in FIG. 15, the above-mentioned QTE signal and the QRSS signal are utilized to form a square wave signal which is superimposed on the DDQS signal thereby to combine the QRS wave and the T wave into a single square wave. The P wave is obtained by removing the combined square wave from the signal through a shift register. In FIG. 15, reference numeral 43 indicates an F—F (flip-flop circuit), 44 an OR gate, 45 a 20 stage shift register with a shift rate of about 5 ms. (the total transmitting time through the shift register should preferably be approximately 100 ms. as the width of a P wave is usually 100 ms.), 46 an AND gate, 47 an F—F, 48 an inverter, and 49 an AND gate. Further, marks $In_{101}$, $In_{102}$ and $In_{103}$ indicate input terminals, and $Ou_{10}$ an output terminal.

In the above arrangement, the QRSS signal (indicated by (c) in FIG. 16) for controlling the QRS wave is applied to the F—F 43 through the input terminal $In_{102}$ to set said F—F 43. Then, the QTE signal as indicated by (d) in FIG. 16 is applied to the F—F 43 and resets it. Accordingly, a square wave signal $FF_1$ as indicated by (e) in FIG. 16 is obtained from the F—F 43. This $FF_1$ signal and the DDQS signal as indicated by (b) in FIG. 11 (the latter being fed through the input terminal $In_{101}$) are combined through the OR gate 44 into a single signal as indicated by (f) in FIG. 16, in which the T wave and the QRS wave are covered with a single square wave excepting the P wave; and the combined signal is applied to the shift register 45. As the pulses corresponding to the P wave of the DDQS signal usually have a pulse width not more than 100 ms., said pulses pass through the shift register 45 and the AND gate 46 unaffected and appear at the output terminal $Ou_{10}$. On the other hand, in the transmission of the above-mentioned square wave, the AND gate 49 receives the whole inputs thereof without fail, since the time interval covering the QRS wave and the T wave is usually 300 ms. to 400 ms. while the transmission time of the shift register 45 is approximately 100 ms. Accordingly, the F—F 47 is set by an output of the AND gate 49 and an output from the F—F 47 inhibits the AND gate 46 to prevent the output from appearing at the output terminal $Ou_{10}$. Then, an output from the shift register 45 is fed to the F—F 47 after being inverted in polarity through the inverter 48 thereby to reset the F—F 47.

Thus, the pulse signal indicative only of the P wave (referred to as a DDQS–P signal) as indicated by (g) in FIG. 16, is obtained at the output terminal $Ou_{10}$, thus allowing the detection of the P wave.

Hereunder, an embodiment of this invention wherein the duration of the P wave is determined will be described.

Figure 17:
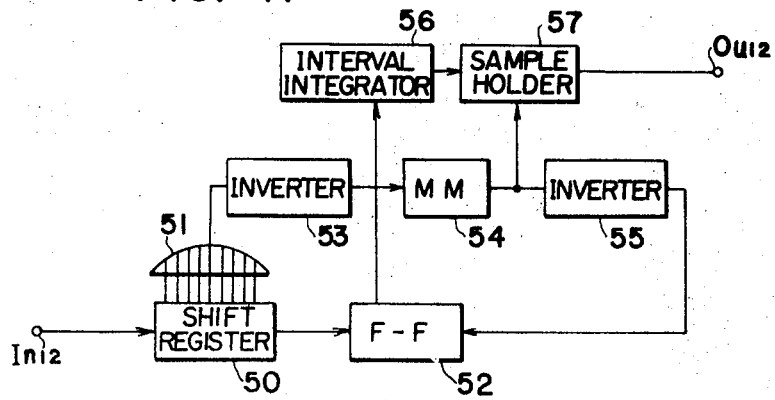

As the duration of the pulse signal indicative of the P wave, that is, the DDQS–P signal does not exceed 100 ms., the pulse signal immediately before the lapse of 100 ms. is assumed to belong to a single P wave. With the assumption, the duration of the P wave is determined by the arrangement shown in FIG. 17, in which reference numeral 50 indicates a shift register the total transmission time of which is set at approximately 100 ms., 51 and OR gate, 52 a F—F, 53 and 55 inverters, 54 a MM unit which is to be triggered by the rise of a pulse, 56 an interval integrator, for example, consisting of a saw-tooth voltage oscillator, and 57 a sample holder. Marks $In_{12}$ and $Ou_{12}$ indicate respectively input and output terminals.

Figure 18:
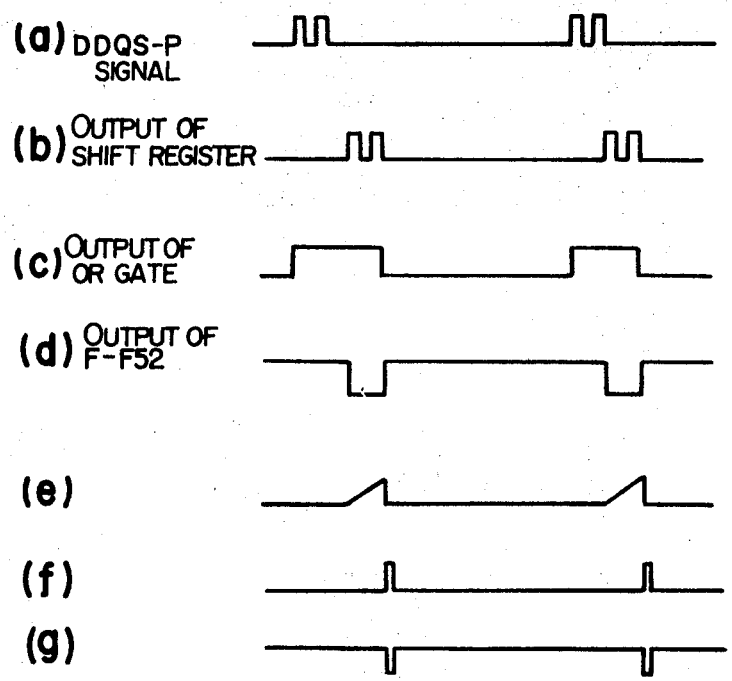

The DDQS–P signal as shown in FIG. 18, which is indicative of a P wave, is applied to the shift register 50 through the input terminal $In_{12}$. The same signal appears at the output of the shift register 50 after the lapse of 100 ms. as indicated by (b) in FIG. 18, and in the meantime, an output as indicated by (c) in FIG. 18 is obtained from the OR gate 51. Accordingly, the F—F 52 is set by the rising part of the pulse as indicated by (b) in FIG. 18, and the integrator 56 starts the integration upon the reception of the output from the F—F 52 as indicated by (e) in FIG. 18. As the output of the OR circuit is inverted through the inverter 53 and then applied to the MM unit 54 to trigger it with the rise of the inverted wave, a pulse signal as indicated by (f) in FIG. 18 is produced from the MM unit 54 when the output of the OR gate falls or when the content of the shift register 50 becomes zero. The output of the MM unit 54 is applied to the sample holder 57, and said sample holder 57 is caused to sample and hold the output of the interval integrator 56, that is, a voltage proportional to the width of the P wave. On the other hand, the output of the MM unit 54 is fed also to the F—F 52 after being inverted through the inveter 55 thereby to reset the F—F 52 and then to stop the operation of the integrator 56.

As described above, the P wave can be recognized as a voltage proportional to the duration thereof. The duration of the P wave can be determined by the use of a delay circuit, too.

Figure 19:
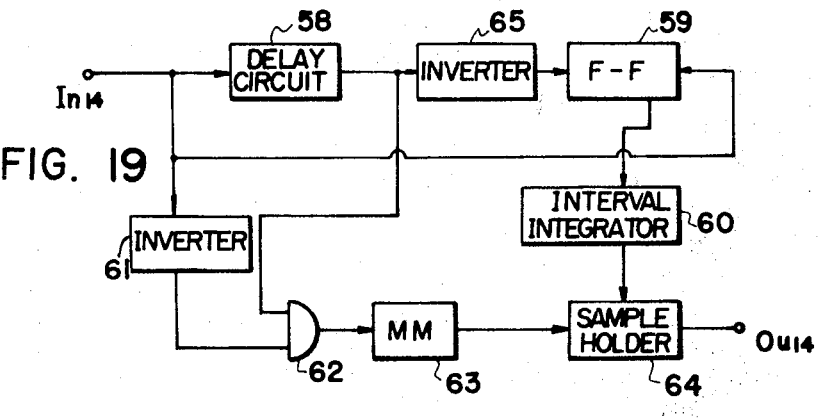

In the arrangement shown in FIG. 19, a delay circuit 58 is utilized to delay the fall of a square wave by 100 ms. If a DDQS–P signal is applied to the input terminal $In_{14}$, the F—F 59 is set by the rise of said input signal, and the output from the F—F 59 releases the reset-state of the interval integrator 60 thereby to cause said integrator 60 to start the integrating operation. Then, the ensuing fall of the DDQS–P signal is applied to the AND gate 62 after being inverted through the inverter 61. As the other input of the AND gate 62 is output from the delay circuit 58, the AND gate 62 produces an output which triggers the MM unit 63. Output of the MM unit 63 actuates the sample holder 64 so that said holder 64 samples and holds the output of the integrator 60. Thus, a voltage proportional to the duration of the DDQS–P signal is obtained at the output terminal $Ou_{14}$. As a DDQS–P signal includes another pulse within 100 ms., the above-described operation is repeated with the rise and fall of said second pulse. As a result, the voltage obtained at the output terminal $Ou_{14}$ is proportional to the interval between the rise of the first pulse and the fall of the second pulse.

If the second pulse does not appear within 100 ms., the end of the DDQS–P signal appears at the output of the delay circuit 58 to reset the F—F 59 after being inverted through the inverter 65. With the resetting of the F—F 59, the interval integrator 60 stops the operation and awaits the next operation.

In the above-described processing of the cardiac signal, it is assumed that only one P wave appears between the end of the portion including the T wave and the beginning of the QRS wave. However, in an abnormal case, a plurality of P waves appear. Especially, in the case of atrium flutter and atrium fibrillation, many of the P waves are found in the cardiac signal. Diagnosis of such disorders as mentioned above is made depending on the regularity of the intervals between two adjacent P waves. If the P waves appear at a regular interval, the disorder is judged as atrium flutter, while if the interval is irregular, the disorder will be atrium fibrillation.

Therefore, it is important to detect the periodicity of the P wave. Means for detecting this periodicity too is provided by this invention.

In the circuit shown in FIG. 20 for detecting the periodicity of the P wave, a sequence of the P waves (that is, a DDQS–P signal sequence) is applied to a shift register and the intervals between waves are classified by respective periods. The number of the P waves in each class of period is counted by a rate meter and then compared with the total number of the P waves. If said number in a certain class is more than 50% of the total number, it is considered to show regularity of the P wave.

In FIG. 20, reference numeral 66 indicates a 24 stage shift register, the shift period being 10 ms. for each stage and 67a to 67d indicate OR gates respectively. In order to determine the number of the P waves that appear with a certain regularity, the shift register 66 and the OR gates 67a to 67d are connected mutually in such a manner that an OR gate receives a plurality of inputs in common with the preceding OR gate and the other inputs in common with the ensuing OR gate. Returning to FIG. 20, numerals 68a to 68d indicate AND gates which respectively receive inputs from said OR gates 67a to 67d and from the first output of the shift register 66; numeral 69a to 69d MM units which are to be triggered respectively by the output from said AND gates; 70a to 70d rate meters respectively for counting the outputs of said MM units; 71 a circuit for detecting the maximum one of the counts made by the respective rate meters; 72 an OR gate which operates with the outputs of said AND gates; 73 a MM unit to be triggered by the output of said OR gate 72; 74 a rate meter for counting the output from said MM unit 73; 75 a divider for making one half of the output of said rate meter; 76 a comparator for comparing the maximum value detected by said maximum value detector 71 with the output from the divider 75; 77 and 78 AND gates; and 79 indicates a F—F. Marks $In_{15}$ and $Ou_{15}$ are respectively input and output terminals, and $In_s$ is an input terminal for sampling number signal.

In the above-described arrangement, if the DDQS–P signals are successively fed to the shift register 66 through the input terminal $In_{15}$, the P waves which occur at an interval longer than, for example, 100 ms. will appear at the output terminals of the shift register to be fed to the OR gates 67a to 67d. Output of the respective OR gates 67a and 67d are fed to the AND gates 68a to 68d along with the output from the first stage of the shift register 66. As a result, the output of the respective AND gates are fed to the associated MM units 69a to 69d to trigger the respective MM units. The rate meters 70a to 70d, receiving the output of the respective MM units 69a to 69d, make count of the number of said output. If it is assumed that P waves which occur at an interval of 140 to 170 ms. are dominant, the OR gate 67b will receive more inputs, and accordingly the AND gate 68b will produce more outputs than the other AND gates, thus causing the rate meter 70b to indicate the maximum count among four rate meters. This maximum count is detected by the maximum value detector 71 and becomes one input of the comparator 76.

On the other hand, the outputs of the AND gates 68a to 68d are fed to the OR gate 72 whose output triggers the MM unit 73. The output of the MM unit 73 is counted by the rate meter 74. Thus, the total number of the P waves which occur at intervals longer than 100 ms. is counted by the rate meter 74. The output of the rate meter 74 becomes the other input of the comparator 76 after having been reduced to one half through the divider 75.

Therefore, if the DDQS–P signal sequence includes regular intervals of P waves more than one half of the total number, the comparator 76 will produce an output as the input from the maximum value detector 71 is higher than the other input. In this case, as a pulse signal indicative of the number of heart-beats over which the examination is to be performed is applied to the AND gates 77 and 78 through the terminal $In_s$, the F—F 79 is set by the output of the AND gate 77 and produces an output at the output terminal $Ou_{15}$, thereby indicating that the P waves appear in sufficient regularity over the tested number of heart-beats. On the contrary, if the number of P waves of regular interval is less than one half of the total, the comparator 76 will produce no output; and when said pulse signal is applied to the input terminal $In_s$, the F—F 79 is reset by the output of the AND gate 78 and produces no output.

As described above, the regularity of the P wave can be detected by this invention. That is, if an output appears at the output terminal $Ou_{15}$, it is indicative of atrium flutter; while a zero output is a sympton of atrium fibrillation. Thus, an automatic diagnosis of heart disorders is made possible by this invention.

It will be obvious that the period during which the regularity of the P waves is examined, the number of the heart-beats to be sampled and the percentage of the regular P waves for determining the regularity of the whole sequence of the P waves, are chosen as desired according to respective cases.

Thus, according to this invention, various information necessary for diagnosis of heart diseases are obtained from the automatic processing of the cardiac signal, thereby making the mass examination of heart disesases practicable.

We claim:

1. An ECG processing system comprising means for differentiating a cardiac potential signal which includes the P wave, QRS wave and T wave thereby to obtain a differentiated cardiac signal, means for producing from said differentiated cardiac signal a first square wave signal consisting of square waves respectively indicative of said P wave, QRS wave and T wave, means which responds to peak values in said differentiated cardiac signal to produce a second square wave signal indicating the existence of said peak values, means for detecting the coincidence between the pulse front of said second square wave signal and the back side of the square wave indicative of the QRS wave in said first square wave signal, and voltage generating means which starts the operation to generate a voltage in response to said first square wave signal and stops the operation in response to an output from said coincidence detecting means, so that the width of the square wave indicative of the QRS wave is detected as a value of voltage.

2. An ECG processing system as defined in claim 1, wherein said means for producing the first square wave signal comprises a pair of pulse generators which operate in response to respective predetermined threshold levels respectively within positive and negative excursions of said differentiated cardiac signal thereby to generate a plurality of positive pulse outputs and negative pulse outputs respectively, means for changing the polarity of said pulse outputs having a preselected polarity to the other polarity, an OR gate whose inputs are the pulse output changed in the polarity through said polarity changing means and the pulse output unchanged in the polarity, and delay means for delaying the pulse output from said OR gate by the order of 10 to 20 ms., so that said plurality of pulse outputs are rendered a pulse signal sequence through said OR gate and said QRS wave is rendered a square wave indicative thereof through said delay means.

3. An ECG processing system as defined in claim 1, wherein said means for producing said second square wave signal comprises means for changing the polarity of pulses included in said differentiated cardiac signal to an identical polarity, means for detecting maximum value in the output signal from said polarity changing means, means for holding said maximum value at a predetermined level, and means for generating a square wave signal on the basis of the output from said holding means, said output from said holding being generated when said maximum value reaches said predetermined level in said holding means.

4. An ECG processing system as defined in claim 3, wherein said maximum value detecting means and said holding means comprises an operation amplifier having a signal input terminal, a feedback terminal and an output terminal; a diode connected to said output terminal of said operation amplifier; a charge-discharge circuit consisting of a resistor and a capacitor which is charged and discharged with the output signal obtained through said diode with a predetermined time constant; and means for negatively feeding back the output from said charge-discharge circuit to said feedback terminal of said operational amplifier; said capacitor being discharged with said predetermined time constant when the maximum value in the input signal is held in said capacitor through said diodes, the potential of said discharging capacitor being fed back to said feedback terminal through said feedback means, and said diode being inversely biased when said input signal becomes smaller than the negatively fed-back signal thereby to produce a saturated voltage of said operation amplifier at said output terminal, thus said maximum value being detected.

5. An ECG processing system as defined in claim 1, which further includes means responsive to a predetermined threshold value within the voltage range of said differentiated cardiac signal for producing a square wave signal indicative of positive going waveforms within the QRS wave, means for producing a square wave signal indicative of negative going waveforms within the QRS wave in the same manner as above, means for producing a plurality of third square wave signals for determining respective regions in which positive and negative peak values exist within the QRS wave using the above-mentioned two square wave signals and a square wave signal indicative of the QRS wave, and means controlled by each of said third square wave signals to detect said positive or negative peak value in the QRS wave.

6. An ECG processing system as defined in claim 5, wherein said peak value detecting means comprises an operational amplifier having a signal input terminal, a feed-back signal input terminal and an output terminal, a switch means having an input for receiving said third square wave signal connected to said signal input terminal, a diode connected to said output terminal, a capacitor connected to said diode, and a source follower circuit connected to said capacitor having an output terminal for taking out an output from said capacitor, and means connecting said output terminal of said source follower to said feed-back signal input terminal, so that when said switch means is actuated by said third square wave signal, the QRS wave is applied to said signal input terminal, positive or negative peak values in the QRS wave being held in said capacitor and being negatively fed back to said feedback signal input terminal through said source follower circuit, whereby said diode is inversely biased so that the peak value in the QRS wave appears at said output terminal of said source follower circuit.

7. An ECG processing system as defined in claim 1, which further includes a pulse generator for generating a continuous pulse signal with a predetermined frequency, pulse signal selecting means fed with said pulse signal as an input and controlled by said first square wave signal so as to inhibit said input pulse signal only when there exists a square wave indicative of the P wave, QRS wave or T wave, a counting means which produces a pulse signal when a predetermined number of the pulses from said pulse signal selecting means is counted, a first plurality of switch means whose input terminals are parallel connected to receive said cardiac signal and which are controlled in a predetermined order by said pulse signal from said counting means, a first plurality of holding means respectively connected to said first switch means to hold said cardiac signal, a second plurality of switch means respectively connected to said first holding means and controlled by said pulse signal from said counting means in synchronization with the operation of associated one of said first switch means, a gate circuit connected to said second switch means and controlled by said second square wave signal, and a second holding means connected to said gate circuit, so that when said second square wave signal is applied to said gate circuit, a voltage immediately before the Q wave is transferred from said first holding means through said second switch means and held in said second holding means.

8. An ECG processing system as defined in claim 7, which further includes a subtractor whose two inputs are said voltage immediately before the Q wave and said cardiac signal so that the subtraction of the former voltage from the latter signal makes the base line a zero potential.

9. An ECG processing system as defined in claim 7, which further includes means for obtaining a pulse signal indicative of the termination of T wave using said second square wave signal and means for detecting the first pulse front of said first square wave signal following the pulse signal obtained by said pulse signal obtaining means, so that said gate circuit is controlled by said first pulse front and thereby a voltage immediately before the P wave is held in said second holding means.

10. An ECG processing system as defined in claim 9, which further includes a subtractor whose two inputs are said voltage immediately before the P wave and said cardiac signal so that the subtraction of the former voltage from the latter signal makes the base line a zero potential.

11. An ECG processing system as defined in claim 9, wherein said pulse signal obtaining means comprises a first monostable multivibrator which is triggered by said second square wave signal, a second monostable multivibrator which is triggered by a portion of the output of said first monostable multivibrator, a sample hold circuit whose input signal is the other portion of the output of said first monostable multivibraor, an integrator which is reset by a pulse output from said second monostable multivibrator, a voltage divider for providing a voltage corresponding to 20% of the value of the output voltage of said sample hold circuit, a comparator for comparing the output of said voltage divider with the output of said integrator, and a third monostable multivibrator which is triggered by an output of said comparator and produces a pulse output after the lapse of a duration of 0.12 second, so that said integrator is reset by pulse output of said second multivibrator only to resume the integrating operation immediately and when the value of the integrated voltage reaches 20% of the initial value, said comparator produces an output which is applied to said third multivibrator.

12. An ECG processing system as defined in claim 1, which further includes means for obtaining a pulse signal indicative of the termination of the T wave, means for producing a fourth square wave signal indicative of the interval between the pulse front of said second square wave signal and the pulse front of said pulse signal indicative of the termination of the T wave, means for producing a fifth square wave signal including a square wave signal indicative of the P wave and another square wave signal indicative of the interval between the pulse front of the QRS wave and the termination of the T wave by combining said first square wave signal and said fourth square wave signal, and means for eliminating said another square wave signal indicative of the interval between the pulse front of the QRS wave and the termination of the T wave from said fifth square wave signal thereby to single out the square wave signal indicative of the P wave.

13. An ECG processing system as defined in claim 12, wherein said means for eliminating said another square wave signal comprises a shift register which has a transmission time of the order of 100 ms., a first AND circuit whose input is the outputs from said shift register, a flip-flop which is set by an output signal from said first AND circuit and reset by the output from said shift register, a second AND circuit having an inhibit terminal inhibited by an output signal of said flip-flop, the second input of said second AND circuit being the output signal of said shift register and an output terminal through which the output of said second AND circuit is taken out.

14. An ECG processing system as defined in claim 12, which further includes a delay means for delaying a square wave signal indicative of the P wave for approximately 100 ms., a detecting means for detecting the square wave signal indicative of P wave which appears during said delay time of said delay means, and a voltage generating means which starts the operation in response to the first pulse front of a square wave signal from said delay means and stops the operation in response to the last output from said detecting means, thus the width of the P wave is detected in terms of said voltage.

15. An ECG processing system as defined in claim 12, which further comprises a shift register having a plurality of consecutive stages which receives a sequence of the square waves indicative of the P waves for a period corresponding to a predetermined number of heartbeats, a first counting means for counting the number of outputs from said shift register during each predetermined period, a second counting means for counting the total number of the outputs from said shift register, and means for comparing the outputs from said first and second counting means mutually and thereby determining the regularity of the P wave in the cardiac signal.

16. An ECG processing system as defined in claim 15, wherein said first counting means comprises a plurality of OR circuits, the corresponding plurality of AND circuits whose first inputs are respectively the outputs of said OR circuits, the second inputs of said AND circuit being the output from the first stage of said shift register, and the corresponding plurality of rate meters which count the respective outputs of said AND circuits, inputs of said OR circuits being outputs from the plurality of consecutive stages of said shift register and each of said OR circuits having a portion of said inputs in common with the preceding OR circuit and the remaining inputs in common with the ensuing OR circuit.

References Cited

UNITED STATES PATENTS

| | | | |
|---|---|---|---|
| 3,123,768 | 3/1964 | Burch et al. | 128—2.06R |
| 3,267,934 | 8/1966 | Thornton | 128—2.06A |
| 3,438,368 | 4/1969 | Karsh | 128—2.06A |
| 3,474,778 | 10/1969 | Yen | 128—2.06F |
| 3,518,983 | 7/1970 | Jorgensen | 128—2.06A |

WILLIAM E. KAMM, Primary Examiner